(12) United States Patent
Ishii (10) Patent No.: US 12,195,128 B2
(45) Date of Patent: Jan. 14, 2025

(54) SUPPORT STRUCTURE FOR IN-VEHICLE COMPONENT

(71) Applicant: SUZUKI MOTOR CORPORATION, Hamamatsu (JP)

(72) Inventor: Tatsuki Ishii, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 656 days.

(21) Appl. No.: 17/492,416

(22) Filed: Oct. 1, 2021

(65) Prior Publication Data

US 2022/0111922 A1    Apr. 14, 2022

(30) Foreign Application Priority Data

Oct. 9, 2020    (JP) .................. 2020-171156

(51) Int. Cl.
*B62J 11/00*    (2020.01)
(52) U.S. Cl.
CPC ...................... *B62J 11/00* (2013.01)
(58) Field of Classification Search
None
See application file for complete search history.

(56) References Cited

U.S. PATENT DOCUMENTS

| | | | |
|---|---|---|---|
| 5,979,966 A | 11/1999 | Suzuki | 296/78.1 |
| 10,011,315 B2 * | 7/2018 | Ishii | B62J 17/02 |
| 10,106,219 B2 * | 10/2018 | Takakuwa | F02M 35/162 |
| 2013/0306391 A1 | 11/2013 | Kontani et al. | 180/219 |

FOREIGN PATENT DOCUMENTS

| | | | |
|---|---|---|---|
| EP | 2962924 A1 * | 1/2016 | B62J 11/13 |
| JP | H 10-273082 A | 10/1998 | |
| JP | 2010-125898 A | 6/2010 | |
| JP | 2013-193594 A | 9/2013 | |
| JP | 2013-237410 A | 11/2013 | |
| JP | 2014-065464 A | 4/2014 | |
| JP | 2020-179722 A | 11/2020 | |

OTHER PUBLICATIONS

Extended European Search Report mailed on Sep. 30, 2022, issued to corresponding European Application No. 21201254.6.
Notice of Reasons for Refusal dated Apr. 2, 2024, issued by the Japanese Patent Office in corresponding application JP 2020-171156.
European Office Action dated Aug. 21, 2024, issued by the European Patent Office in corresponding application EP 21 201 254.6.

* cited by examiner

*Primary Examiner* — Joseph D. Pape
(74) *Attorney, Agent, or Firm* — Stein IP LLC (57) ABSTRACT

There is provided a support structure for an in-vehicle component that supports an in-vehicle component at a front side of a vehicle body frame. The support structure for an in-vehicle component includes a first brace attached to a front portion of the vehicle body frame, and a second brace attached to a front portion of the first brace. The first brace has a frame structure that is opened toward a front side, the second brace has a box shape that is open at least on a rear surface side, and an installation space for the in-vehicle component is formed by the first brace and the second brace.

6 Claims, 9 Drawing Sheets

SUPPORT STRUCTURE FOR IN-VEHICLE COMPONENT

CROSS-REFERENCE TO RELATED APPLICATIONS

The disclosure of Japanese Patent Application No. 2020-171156 filed on Oct. 9, 2020, including specification, drawings and claims is incorporated herein by reference in its entirety.

BACKGROUND

The present invention relates to a support structure for an in-vehicle component.

As a support structure for an in-vehicle component, there is known a support structure that supports various in-vehicle components by a cowl brace attached to a vehicle body frame (see, for example, Patent Literature 1). The cowl brace disclosed in Patent Literature 1 is formed by integrating a metal pipe and a metal bracket by welding. In the cowl brace, an overhang frame extends toward a front side from a head pipe of a vehicle body frame, and a front cowl and a headlamp are attached to a front frame on a front end side of the overhang frame. Further, in the cowl brace, an in-vehicle component on an inner side of the front cowl is attached so as not to interfere with various frames.

Patent Literature 1: JP-A-2013-193594

SUMMARY

According to one advantageous aspect of the present invention, there is provided a support structure for an in-vehicle component according to an aspect of the present invention that supports an in-vehicle component at a front side of a vehicle body frame, the support structure including: a first brace that is attached to a front portion of the vehicle body frame; and a second brace that is attached to a front portion of the first brace, in which the first brace is a frame structure that is opened toward a front side, the second brace has a box shape that is open at least on a rear surface side, and an installation space for the in-vehicle component is formed by the first brace and the second brace.

DETAILED DESCRIPTION OF EXEMPLIFIED EMBODIMENTS

The cowl brace disclosed in Patent Literature 1 is formed by welding a metal pipe and a metal bracket, and a shape of the cowl brace is complicated. Therefore, an installation space for an in-vehicle component and a working space cannot be secured on an inner side of the cowl brace. Therefore, there is a problem that the in-vehicle component is disposed on an outer side of the cowl brace, resulting in an increase in size of a front portion of a vehicle body.

The present invention has been made in view of the above, and an object of the present invention is to provide a support structure for an in-vehicle component capable of securing an installation space for an in-vehicle component and a working space and making a front portion of a vehicle body compact.

A support structure for an in-vehicle component according to an aspect of the present invention supports an in-vehicle component at a front side of a vehicle body frame by a first brace having a frame structure and a second brace having a box shape. The first brace is attached to a front portion of the vehicle body frame, and the second brace is attached to a front portion of the first brace. The frame structure of the first brace is opened toward a front side, and a rear surface side of the second brace having a box shape is open. Therefore, an in-vehicle component can be disposed on inner sides of the first brace and the second brace, thereby making a front portion of a vehicle body compact. In addition, since the first brace and the second brace are separated in a front-rear direction, a working space for attaching the in-vehicle component to the first brace and the second brace can be sufficiently secured.

Figure 1:
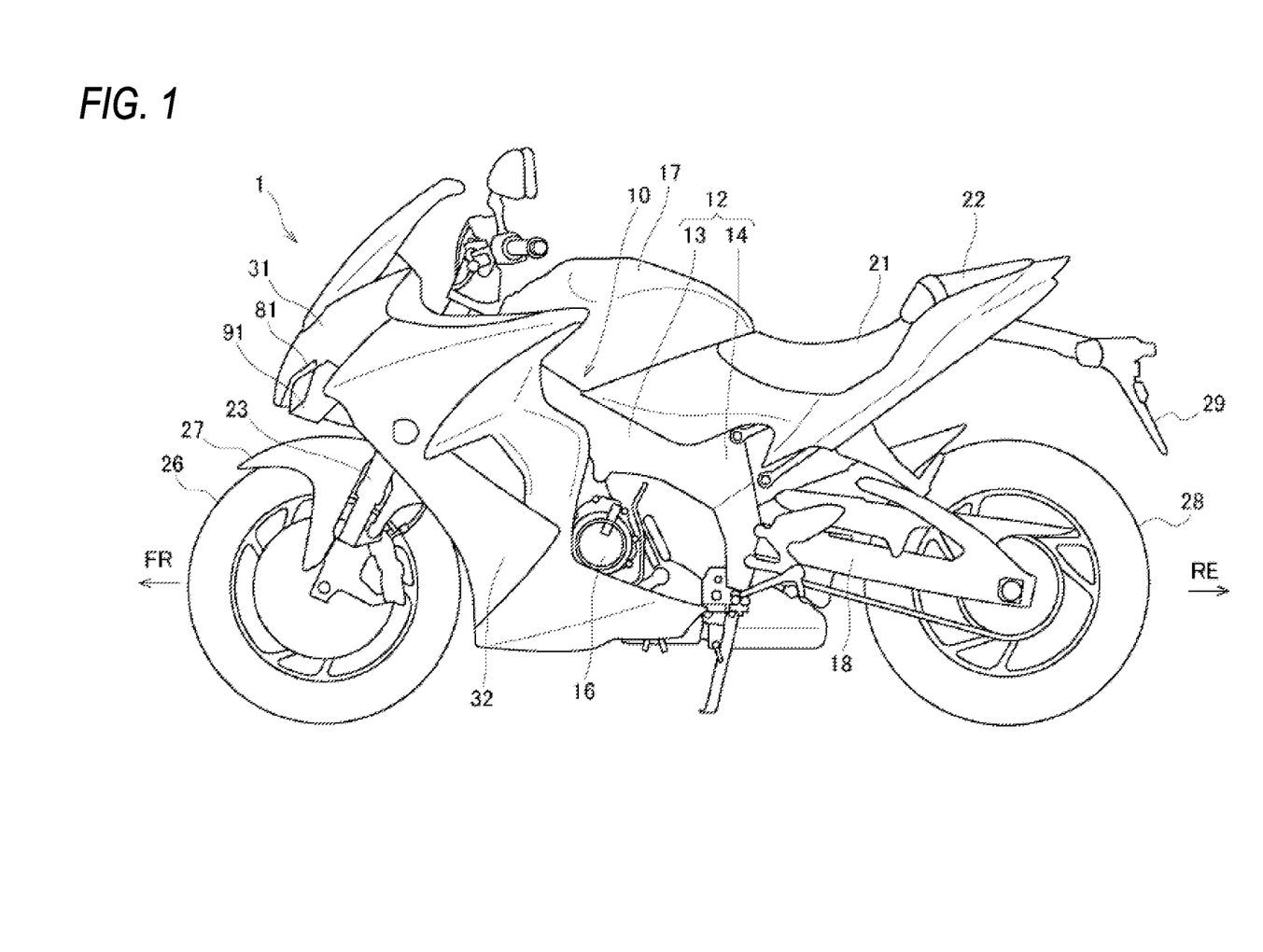
FIG. 1 is a left side view of a straddle-type vehicle according to the present embodiment.

Hereinafter, the present embodiment will be described in detail with reference to the accompanying drawings. FIG. 1 is a left side view of a straddle-type vehicle according to the present embodiment. Further, in the following drawings, an arrow FR indicates a vehicle front side, an arrow RE indicates a vehicle rear side, an arrow L indicates a vehicle left side, and an arrow R indicates a vehicle right side.

As illustrated in FIG. 1, a straddle-type vehicle 1 includes various types of components such as an engine 16 and an electrical system that are mounted on a twin spar-type vehicle body frame 10 formed by aluminum casting. The vehicle body frame 10 includes a pair of main frames 12 branching from a head pipe 11 (see FIG. 2) to the left and right and extending toward the rear side, and a pair of down frames (not shown) branching from the head pipe 11 to the left and right and extending toward a lower side. A rear portion of the engine 16 is supported by the pair of main frames 12, and a front portion of the engine 16 is supported by the pair of down frames. By supporting the engine 16 with the vehicle body frame 10, rigidity of the entire vehicle is secured.

Front-side portions of the main frames 12 serve as tank rails 13 positioned above the engine 16, and a fuel tank 17 is supported by the tank rails 13. Rear-side portions of the main frames 12 serve as body frames 14 positioned behind the engine 16, and swing arms 18 are swingably supported at substantially middle positions of the body frames 14 in an up-down direction. Seat rails (not shown) and a back stay (not shown) extend toward the rear side from upper portions of the body frames 14. A rider seat 21 and a pillion seat 22 are supported on the seat rails on a rear side of the fuel tank 17.

A pair of front forks 23 are supported on the head pipe 11 via a steering shaft (not shown) so as to be steered. A front wheel 26 is rotatably supported by lower portions of the front forks 23, and an upper portion of the front wheel 26 is covered with a front fender 27.

The swing arms 18 extend toward the rear side from the body frames 14. A rear wheel 28 is rotatably supported at rear ends of the swing arms 18, and an upper side of the rear wheel 28 is covered with a rear fender 29. The engine 16 is coupled to the rear wheel 28 via a chain drive type transmission mechanism, and power from the engine 16 is transmitted to the rear wheel 28 via the transmission mechanism.

A cowl brace 40 (see FIG. 2) is attached to the vehicle body frame 10, and the straddle-type vehicle 1 is covered with various types of covers supported by the cowl brace 40. For example, a front surface side of a vehicle front portion is covered with a front cowl 31, and side surface sides of the vehicle front portion are covered with a pair of side cowls 32. The cowl brace 40 supports a position lamp 81 and a pair of headlamps 91. The position lamp 81 is exposed at a center of the front cowl 31, and the pair of headlamps 91 are exposed on both left and right sides of the vehicle with the position lamp 81 sandwiched therebetween. Various types of in-vehicle components other than the lamps are also supported by the cowl brace 40.

In a normal straddle-type vehicle, after a structure of a front cowl or a cowl brace is determined, an in-vehicle component is attached to the cowl brace by using an empty space. However, a general cowl brace has a frame structure in which a metal pipe or a metal bracket is welded, and it is difficult to secure, between metal pipes that are joined in a complicated manner, an installation space or a working space for the in-vehicle component. Since the in-vehicle component does not fit on an inner side of the cowl brace, the in-vehicle component is attached on an outer side of the cowl brace, and improvement is required in terms of making a front portion of a vehicle body of the straddle-type vehicle compact.

Further, if a heavy object such as a rectifier is attached to the cowl brace at a position close to one side in a left-right direction as an in-vehicle component, weight distribution of the vehicle body is not even in the left-right direction, and steering stability deteriorates. In addition, when a load of the in-vehicle component acting on the cowl brace is not even in the left-right direction and a reinforcing member is added in order to compensate for strength against the load, a weight of the cowl brace is increased due to the reinforcing member. In addition, vibration characteristics are different between a left-side part of the vehicle body and a right-side part of the vehicle body due to variation in the weight distribution of the vehicle body, and visibility of left and right mirrors provided in the front cowl is changed due to the difference in the vibration characteristics.

Therefore, in the present embodiment, the cowl brace 40 is formed by combining a first brace 41 having a frame structure opened toward the front side and a second brace 61 having a box shape open on a rear surface side. The in-vehicle component is fitted on an inner side of the cowl brace 40, thereby making the front portion of the vehicle body compact. Further, since the first brace 41 and the second brace 61 are separated in a front-rear direction, the working space for attaching the in-vehicle component to the cowl brace 40 is secured. Further, since the in-vehicle component is fitted on the inner side of the cowl brace 40, the in-vehicle component is attached to a center in the left-right direction, and the weight distribution of the vehicle body is made close to even in the left-right direction.

Figure 2:
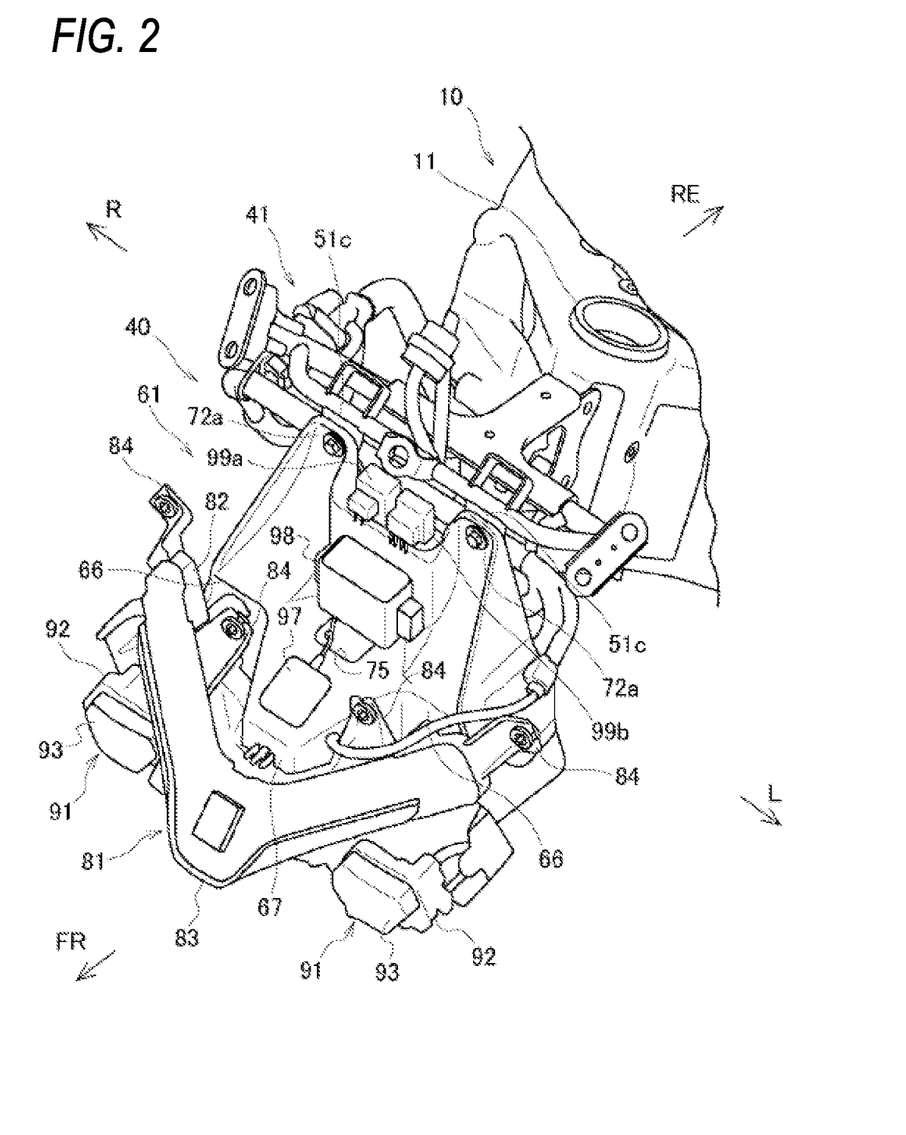
FIG. 2 is a perspective view of a periphery of a cowl brace according to the present embodiment.
Figure 3:
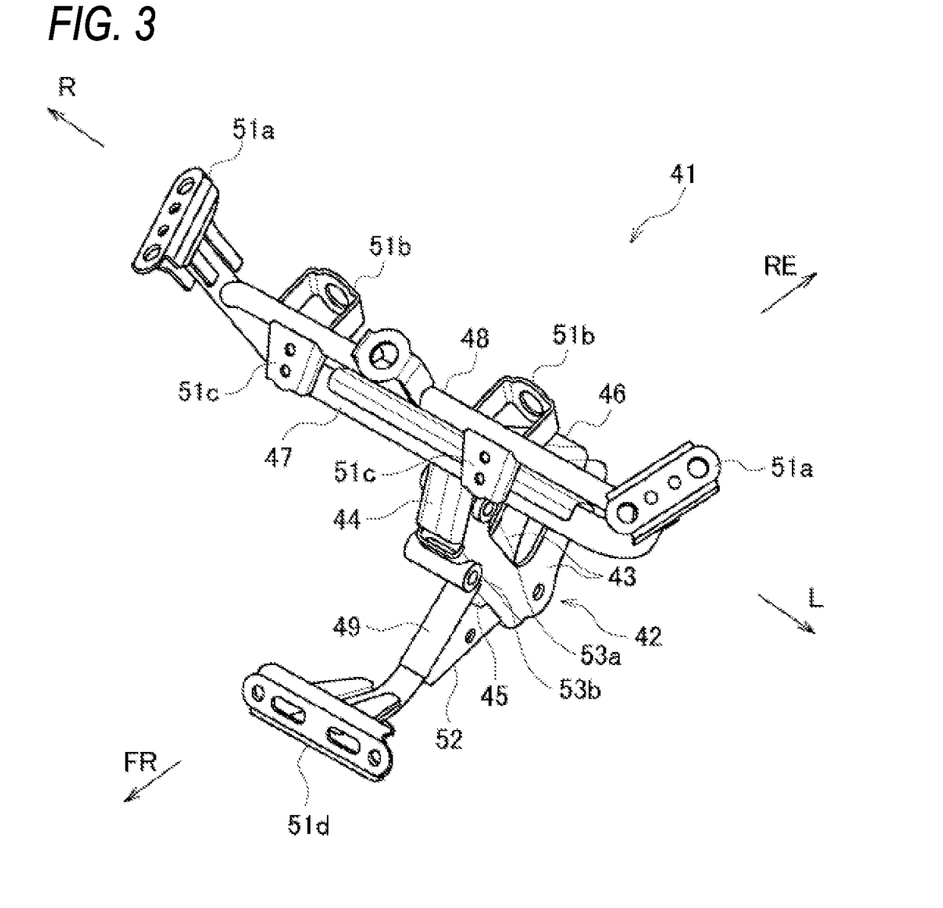
FIG. 3 is a perspective view of a first brace according to the present embodiment as viewed from a front side.
Figure 4:
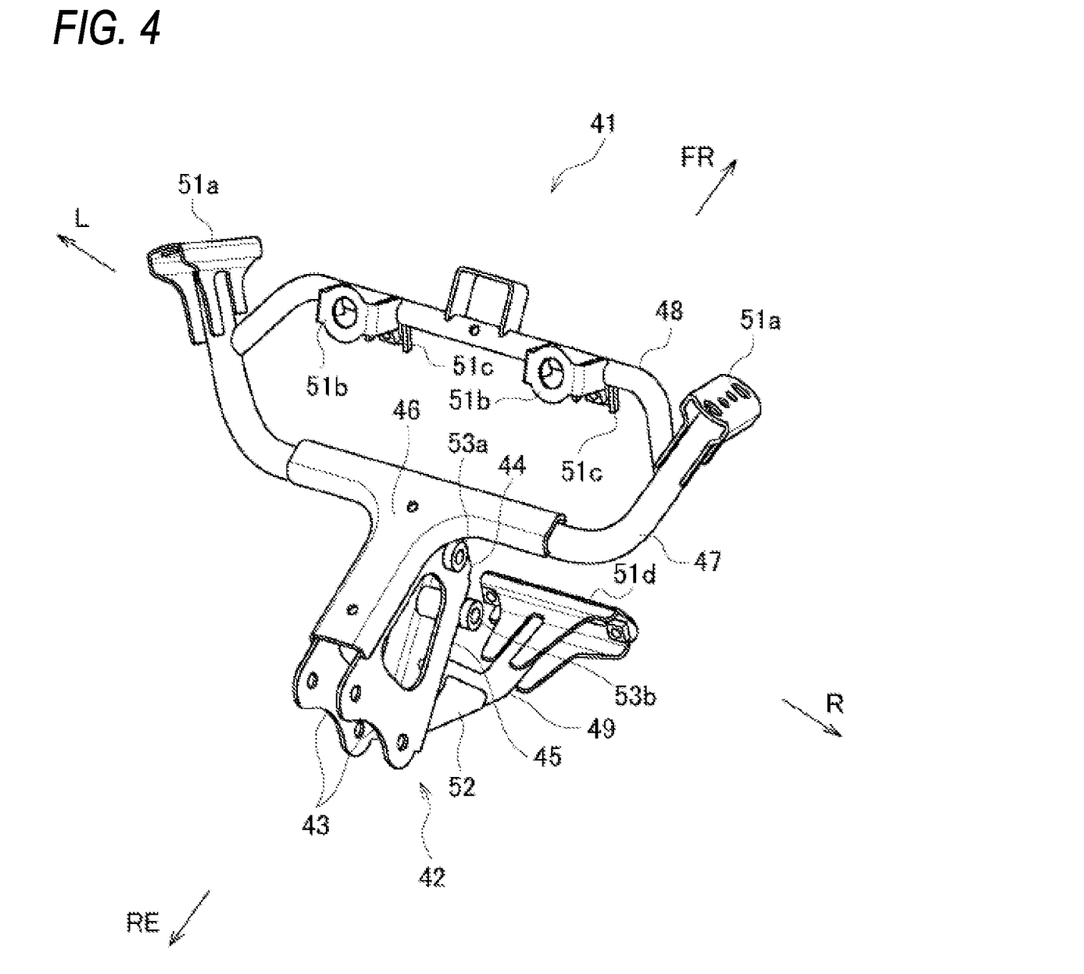
FIG. 4 is a perspective view of the first brace according to the present embodiment as viewed from a rear side.
Figure 5:
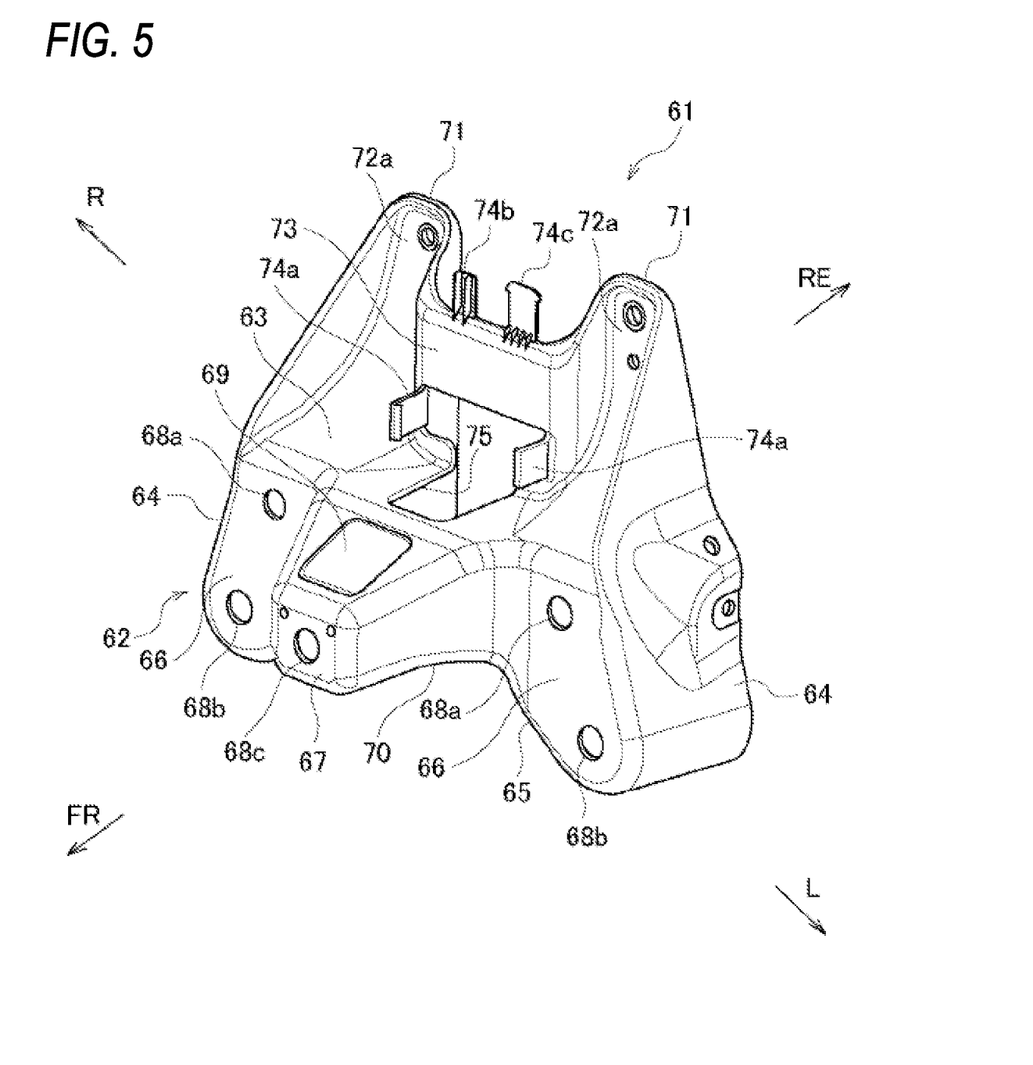
FIG. 5 is a perspective view of a second brace according to the present embodiment as viewed from a front side.
Figure 6:
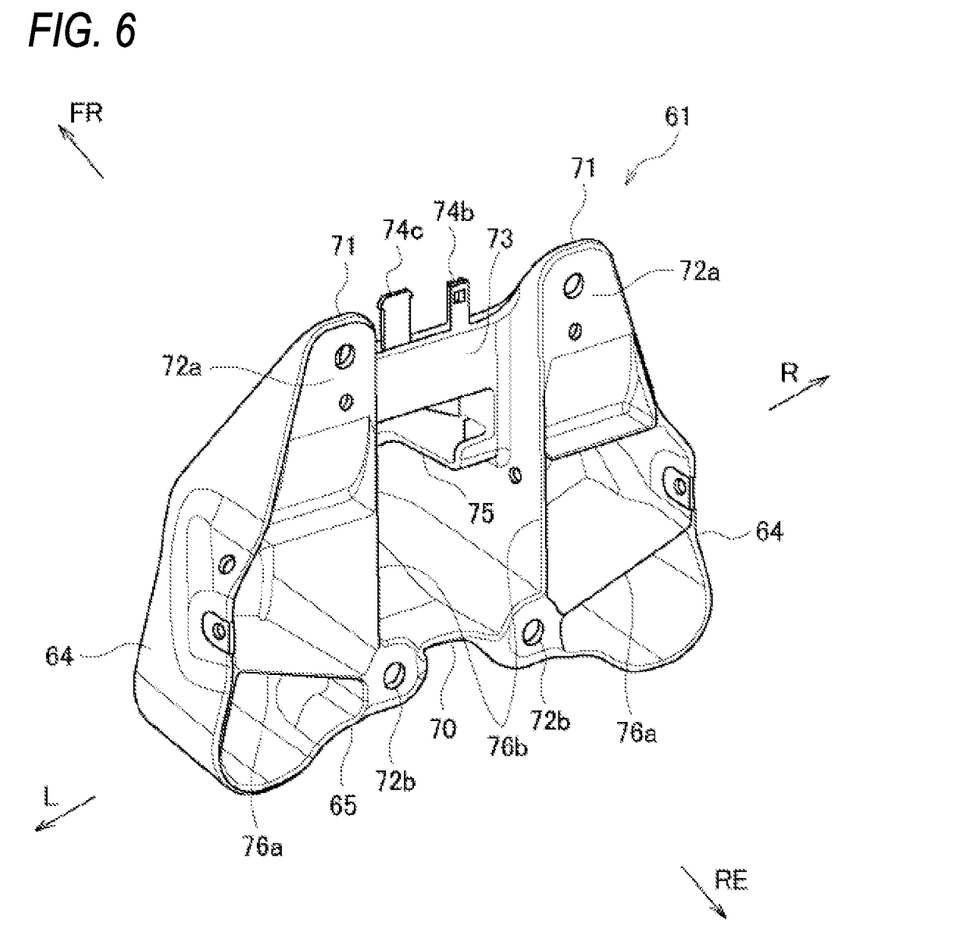
FIG. 6 is a perspective view of the second brace according to the present embodiment as viewed from a rear side.

Hereinafter, a cowl brace serving as a support structure for an in-vehicle component will be described with reference to FIGS. 2 to 6. FIG. 2 is a perspective view of a periphery of the cowl brace according to the present embodiment. FIG. 3 is a perspective view of a first brace according to the present embodiment as viewed from the front side. FIG. 4 is a perspective view of the first brace according to the present embodiment as viewed from the rear side. FIG. 5 is a perspective view of a second brace according to the present embodiment as viewed from the front side. FIG. 6 is a perspective view of the second brace according to the present embodiment as viewed from the rear side.

As illustrated in FIG. 2, the cowl brace 40 supports in-vehicle components at a front side of the vehicle body frame 10, on an inner side of the front cowl 31 (see FIG. 1). The cowl brace 40 includes the first brace 41 made of metal and attached to the head pipe 11, and the second brace 61 made of resin and attached to a front portion of the first brace 41. The first brace 41 is formed of a metal bracket, a metal pipe, or the like, and forms a framework on a base end side of the cowl brace 40. The second brace 61 is formed in a box shape that is open on the rear surface side, and various types of in-vehicle components are attached to an outer surface of the second brace 61.

For example, the position lamp 81 having a V shape in a front view is attached to a front surface of the second brace 61, and the pair of headlamps 91 are attached below the position lamp 81. In the second brace 61, an electronic toll collection (ETC) antenna 97 is attached on a rear side of the position lamp 81. In addition, in the second brace 61, a local interconnect network (LIN) controller 98 is attached on a rear side of the ETC antenna 97, and relays 99a and 99b are attached on an upper side of the LIN controller 98. Details of attachment positions of these in-vehicle components will be described later.

As illustrated in FIGS. 3 and 4, the first brace 41 has a frame structure opened toward the front side. A rear-side frame-shaped frame 42 of the first brace 41 includes a pair of frame plates 43 facing each other in the left-right direction, a front plate 44 connecting front edges of the pair of frame plates 43, and a lower plate 45 connecting lower edges of the pair of frame plates 43. Rear frames of the pair of frame plates 43 serve as sandwiching plates that sandwich the head pipe 11. A T-shaped bracket 46 is fixed to upper edges of the pair of frame plates 43, and upper surfaces of the pair of frame plates 43 are covered by vertical plates of the T-shaped bracket 46 that are long in the front-rear direction. A front end side of the T-shaped bracket 46 serves as a transverse plate that is long in the left-right direction, and a U-shaped upper arm 47 is fixed to front portions of the pair of frame plates 43 via the transverse plate of the T-shaped bracket 46.

The upper arm 47 extends from the transverse plate of the T-shaped bracket 46, and extending portions of the upper arm 47 are curved toward the front side while expanding in the left-right direction. A pair of attachment brackets 51a for the front cowl 31 (see FIG. 1) are fixed to both ends of the upper arm 47. Portions of the upper arm 47 close to the pair of attachment brackets 51a are connected via an inverted U-shaped bridge 48. A pair of attachment brackets 51b for a meter unit (not shown) are fixed to a rear surface portion of the bridge 48 at a predetermined interval, and a pair of attachment brackets 51c for the second brace 61 are fixed to a front surface portion of the bridge 48 at a predetermined interval.

A lower arm 49 extends toward the front side from the lower plate 45 of the frame-shaped frame 42, and an attachment bracket 51*d* for the second brace 61 is fixed to a front end of the lower arm 49. The attachment bracket 51*d* is formed with an attachment surface that is long in the left-right direction. A reinforcing bracket 52 having a triangular shape in a side view and supporting a lower surface of the lower arm 49 is fixed to the lower plate 45 of the frame-shaped frame 42. Support portions 53*a* and 53*b* for a rectifier 100 (see FIG. 9) are provided on the front plate 44 and the lower plate 45 of the first brace 41. A space between the upper arm 47 and the lower arm 49 of the first brace 41 is used as an installation space for the rectifier 100.

As illustrated in FIGS. 5 and 6, the second brace 61 is molded with a resin material that is lighter in weight and higher in vibration damping rate than the first brace 41 (see FIG. 4), by using a mold for front and rear removal. The second brace 61 is formed in a box shape that is open in a rear surface, by a front wall portion 62 expanding in the left-right direction, an upper wall portion 63 extending toward the rear side from an upper edge of the front wall portion 62, a pair of side wall portions 64 extending toward the rear side from side edges of the front wall portion 62, and a bottom wall portion 65 extending toward the rear side from a lower edge of the front wall portion 62. A weight of the second brace 61 is reduced, and rigidity of the second brace 61 is improved. In addition, an installation space for peripheral components and wiring is secured on a rear surface side of the second brace 61.

The front wall portion 62 includes a pair of left-right front wall portions 66 positioned on both left and right sides, and a central front wall portion 67 protruding toward the front side from the pair of left-right front wall portions 66. Upper half portions of the pair of left-right front wall portions 66 serve as attachment surfaces on both end sides of the position lamp 81 (see FIG. 2), and attachment holes 68*a* for the position lamp 81 are formed in the attachment surfaces of the upper half portions. Lower half portions of the pair of left-right front wall portions 66 serve as attachment surfaces of the pair of headlamps 91 (see FIG. 2), and attachment holes 68*b* for the headlamps 91 are formed in the attachment surfaces of the lower half portions. The lower half portions of the pair of left-right front wall portions 66 protrude toward a lower side from the central front wall portion 67.

The central front wall portion 67 is formed in a bottomed cylindrical shape like a truncated pyramid. A front surface of the central front wall portion 67 serves as an attachment surface for a center of the position lamp 81, and an attachment hole 68*c* for the position lamp 81 is formed in the attachment surface of the front surface. An upper surface of the central front wall portion 67 is slightly recessed in a rectangular shape in a top view, and an attachment surface 69 for the ETC antenna 97 (see FIG. 2) is formed by the slight recess. A center of the bottom wall portion 65 is recessed toward an upper side, and the lower half portions of the pair of left-right front wall portions 66 protrude toward a lower side. With a recess 70 of the center, interference between a headlamp controller 96 (see FIG. 8) described later and the bottom wall portion 65 is avoided.

A pair of extending portions 71 extend toward an upper side from both left and right sides of the upper wall portion 63. Front surfaces of the pair of extending portions 71 are curved in a concave shape, and brace attachment portions 72*a* corresponding to the pair of attachment brackets 51*c* (see FIG. 3) of the first brace 41 are formed on upper end sides of the front surfaces of the pair of extending portions 71. Side surfaces of the pair of extending portions 71 on outer sides in the left-right direction are connected to the pair of side wall portions 64, and side surfaces of the pair of extending portions 71 on inner sides in the left-right direction are connected to each other via a connecting plate 73. Installation spaces for the LIN controller 98 (see FIG. 2) and the relays 99*a* and 99*b* (see FIG. 2) are formed between the pair of extending portions 71.

In this case, on a lower side of the connecting plate 73, a pair of attachment pieces 74*a* for the LIN controller 98 protrude toward the front side from side surfaces of the pair of extending portions 71 on inner sides in a vehicle width direction. The installation space for the LIN controller 98 is secured on a front surface side of the connecting plate 73. A pair of attachment pieces 74*b* and 74*c* for the relays 99*a* and 99*b* protrude toward an upper side from an upper edge of the connecting plate 73. The connecting plate 73 protrudes toward the front side, and the installation space for the relays 99*a* and 99*b* is secured on a rear surface side of the connecting plate 73. A center of the upper wall portion 63 is cut out, and wiring of the ETC antenna 97 and the LIN controller 98 is drawn to the rear surface side of the second brace 61 through a cutout 75.

The rear surface side of the second brace 61 is partitioned by a plurality of partition walls. A back surface side of each of the left-right front wall portions 66 is partitioned into upper and lower parts by a first partition wall portion 76*a*, and the back surface side of each of the left-right front wall portions 66 and a back surface side of the central front wall portion 67 are partitioned into left and right parts by a second partition wall portion 76*b*. With the first and second partition wall portions 76*a* and 76*b*, rigidity of the second brace 61 is improved. The first and second partition wall portions 76*a* and 76*b* are integrated on a bottom wall portion 65 side, and a pair of brace attachment portions 72*b* corresponding to the attachment bracket 51*d* (see FIG. 3) of the first brace 41 are formed at portions where the first and second partition wall portions 76*a* and 76*b* are integrated.

As described above, since the second brace 61 does not have an undercut, the second brace 61 can be easily resin-molded by a simple mold for front and rear removal. The rear surface side of the second brace 61 is formed in a hollow box shape to achieve weight reduction.

Therefore, even when the second brace 61 is attached to the first brace 41 and the length of the cowl brace 40 in the front-rear direction is increased, a weight of the entire cowl brace 40 is not excessively increased. Further, since the second brace 61 is formed of a resin material having a high vibration damping rate, the vibration of the in-vehicle components attached to the second brace 61 is effectively suppressed.

Figure 7:
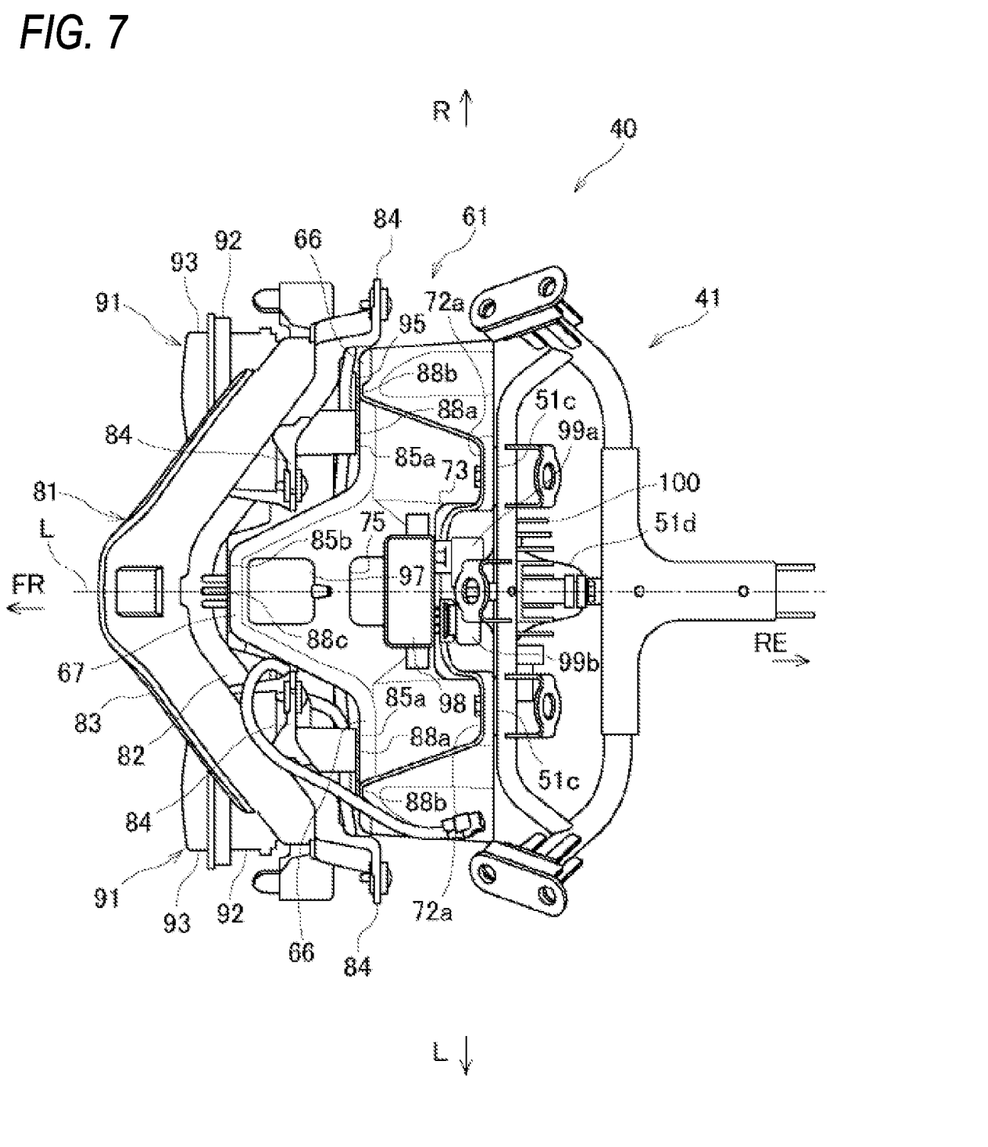
FIG. 7 is a top view of the cowl brace to which in-vehicle components are attached according to the present embodiment.
Figure 8:
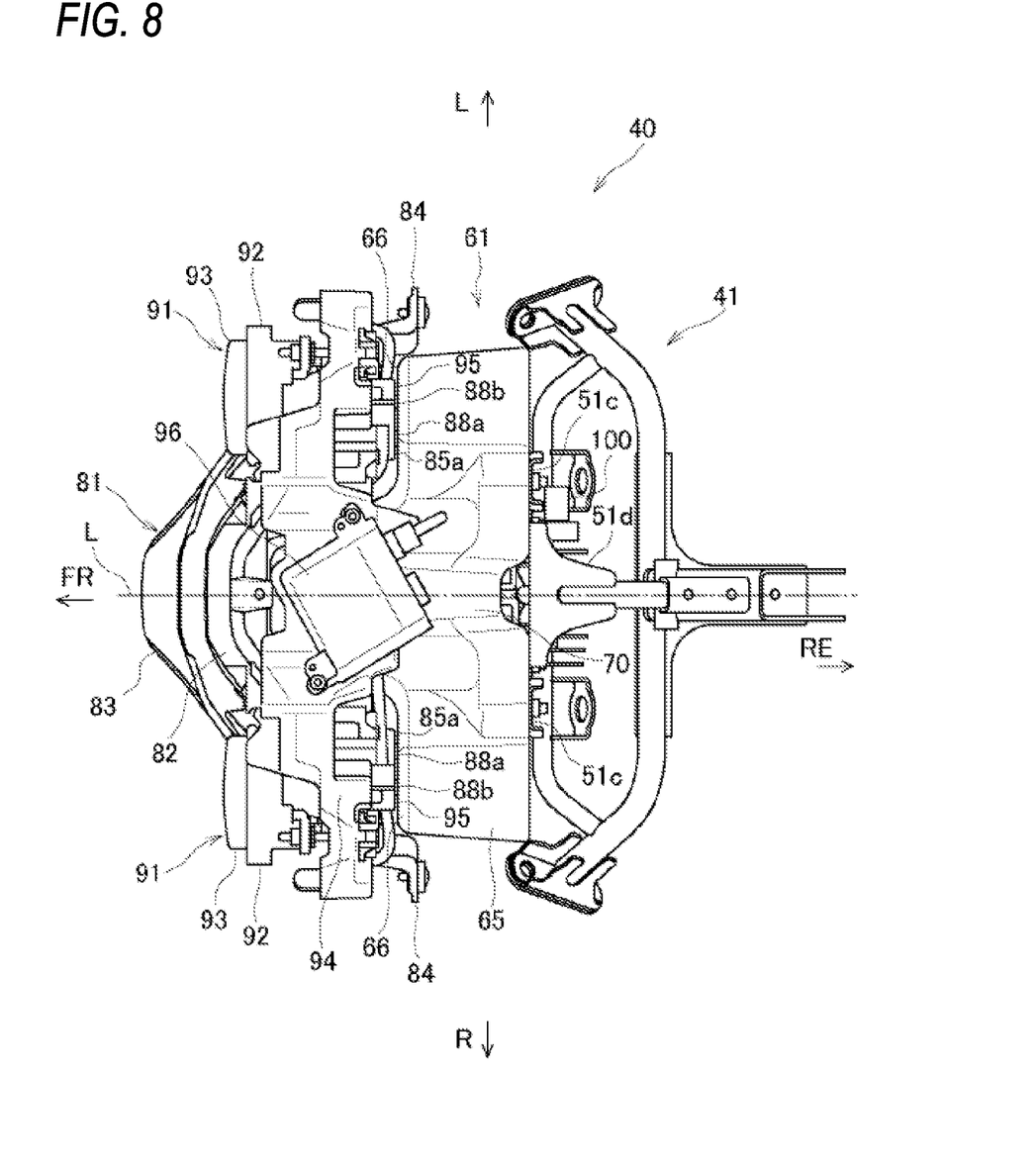
FIG. 8 is a bottom view of the cowl brace to which the in-vehicle components are attached according to the present embodiment.
Figure 9:
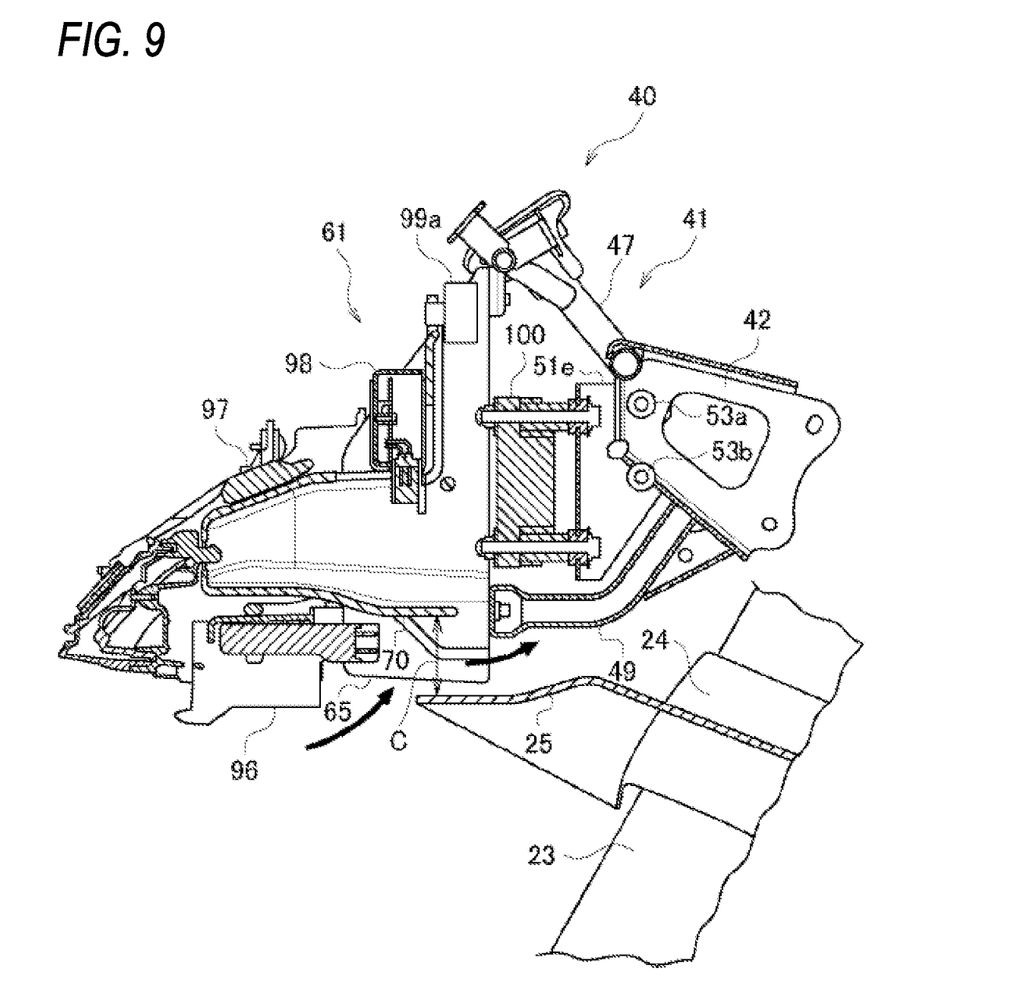
FIG. 9 is a longitudinal cross sectional view of the periphery of the cowl brace according to the present embodiment.

With reference to FIGS. 7 to 9, an attachment state of the in-vehicle components will be described. FIG. 7 is a top view of the cowl brace to which the in-vehicle components are attached according to the present embodiment. FIG. 8 is a bottom view of the cowl brace to which the in-vehicle components are attached according to the present embodiment. FIG. 9 is a longitudinal cross sectional view of the periphery of the cowl brace according to the present embodiment.

As illustrated in FIGS. 2, 7, and 8, the pair of brace attachment portions 72*a* of the second brace 61 are aligned with the pair of attachment brackets 51*c* of the first brace 41, and the pair of attachment brackets 51*c* and the brace attachment portions 72*a* are fixed by bolts. The pair of brace attachment portions 72*b* (see FIG. 6) of the second brace 61 are aligned with the attachment bracket 51*d* of the first brace 41, and both ends of the attachment bracket 51*d* and the pair of brace attachment portions 72*b* are fixed by bolts. The first brace 41 made of metal and the second brace 61 made of resin are connected to each other to form the cowl brace 40 that supports the front cowl 31 and the in-vehicle components.

The position lamp 81 extends toward the rear side while extending from the center in the left-right direction toward the outer sides in the left-right direction in a top view. In the position lamp 81, a lens cover 83 is fitted to an opening of a front surface of a position lamp case 82. The position lamp case 82 is provided with a plurality of attachment brackets 84 for attaching the position lamp 81 to the front cowl 31. On a rear surface side of the position lamp case 82, a pair of attachment surfaces 85a facing the pair of left-right front wall portions 66 of the second brace 61 are formed, and an attachment surface 85b facing the central front wall portion 67 of the second brace 61 is formed.

In each of the pair of attachment surfaces 85a of the position lamp case 82, a screw hole is formed. Rubber bushes 88a are fitted to the attachment holes 68a (see FIG. 5) of the pair of left-right front wall portions 66, and bolts inserted into the rubber bushes 88a are fixed to the screw holes of the attachment surfaces 85a. On the attachment surface 85b of the position lamp case 82, a projection is formed. A rubber bush 88c is fitted to the attachment hole 68c (see FIG. 5) of the central front wall portion 67, and the projection on the attachment surface 85b is fixed by being inserted into the rubber bush 88c. Since portions of the rubber bushes 88a and 88c protrude from front surfaces of the pair of left-right front wall portions 66 and the central front wall portion 67, a gap is formed between the position lamp case 82 and the second brace 61.

The pair of headlamps 91 are positioned on the outer sides in the left-right direction below the position lamp 81. In each of the headlamps 91, a lens cover 93 is fitted to an opening in a front surface of a headlamp case 92. Lower portions of the pair of headlamps 91 are connected by a plate-shaped connecting portion 94. The plate-shaped connecting portion 94 is positioned below the truncated-pyramid-like central front wall portion 67 of the second brace 61, and the headlamp controller 96 for controlling the pair of headlamps 91 is attached to a center of a lower surface of the plate-shaped connecting portion 94. The headlamp controller 96 is accommodated in the recess 70 of the bottom wall portion 65 of the second brace 61.

On a rear surface side of the plate-shaped connecting portion 94, a pair of attachment surfaces 95 are formed that face the pair of left-right front wall portions 66 of the second brace 61. In the pair of attachment surfaces 95 of the plate-shaped connecting portion 94, screw holes are formed. Rubber bushes 88b are fitted to the attachment holes 68b (see FIG. 5) of the pair of left-right front wall portions 66, and bolts inserted into the rubber bushes 88b are fixed to the screw holes of the attachment surfaces 95. Since portions of the rubber bushes 88b protrude from the front surfaces of the pair of left-right front wall portions 66, a gap is formed between the plate-shaped connecting portion 94 and the second brace 61. As described above, the position lamp 81 and the pair of headlamps 91 are floatingly supported by the second brace 61 via the rubber bushes 88a to 88c.

The ETC antenna 97 that transmits and receives toll information to and from a roadside antenna is attached to the attachment surface 69 on the upper surface of the truncated-pyramid-like central front wall portion 67. By attaching the ETC antenna 97 at a front end side of the second brace 61, it is possible to smoothly pass through a toll gate by transmitting and receiving the toll information at a front portion of the straddle-type vehicle 1 in a traveling direction. The LIN controller 98 for controlling LIN communication is attached to the pair of attachment pieces 74a (see FIG. 5) on the rear side of the ETC antenna 97. The wiring of the ETC antenna 97 and the LIN controller 98 is drawn through the cutout 75 of the second brace 61 to the rear surface side of the second brace 61.

The connecting plate 73 is positioned on the rear side of the LIN controller 98, and the relays 99a and 99b are attached to the pair of attachment pieces 74b and 74c (see FIG. 5) on the connecting plate 73. Main body portions of the relays 99a and 99b are accommodated on the rear surface side of the connecting plate 73. As described above, the in-vehicle components such as the position lamp 81, the pair of headlamps 91, the headlamp controller 96, the ETC antenna 97, the LIN controller 98, and the relays 99a and 99b are attached to the second brace 61. Therefore, even when vibration of the engine 16 is transmitted to the first brace 41, the vibration is damped by the second brace 61 and the rubber bushes 88a to 88c, and thus the vibration of the in-vehicle components is suppressed.

The position lamp 81, the headlamp controller 96, the ETC antenna 97, and the LIN controller 98 are provided on a central line L extending in a vehicle body front-rear direction of the cowl brace 40. The pair of headlamps 91 as well as the relays 99a and 99b are provided symmetric positions with respect to the central line L. Further, the rectifier 100, which is a heavy object, is attached to the first brace 41 such that a part of the rectifier 100 overlaps the central line L. A plurality of in-vehicle components are attached to the cowl brace 40 in consideration of weight distribution in the left-right direction of the vehicle body.

As described, since weight distribution at the time when in-vehicle components other than the position lamp 81 and the pair of headlamps 91 are attached to the cowl brace 40 is taken into consideration, the weight distribution of the vehicle body is made close to even in the left-right direction, and the steering stability is improved. The vibration characteristics of the vehicle body are also made close to uniform in the left-right direction, and the visibility of the left and right mirrors (not shown) attached to the front cowl 31 (see FIG. 1) is improved. Distribution of load of the plurality of in-vehicle components acting on the cowl brace 40 is also made close to even in the left-right direction. Accordingly, reinforcement to the cowl brace 40 is not required, and the weight reduction is achieved.

As illustrated in FIG. 9, the upper arm 47 of the first brace 41 extends obliquely upward while extending toward the front side from the frame-shaped frame 42, and the lower arm 49 of the first brace 41 extends obliquely downward while extending toward the front side from the frame-shaped frame 42. The rear surface side of the second brace 61 on a front side of the first brace 41 is open. Therefore, an installation space for the rectifier 100, which rectifies AC power generated by an alternator (not shown) to DC power, is formed on a rear side of the second brace 61 between the upper arm 47 and the lower arm 49. Accordingly, the rectifier 100 is accommodated on the inner side of the cowl brace 40, thereby making the front portion of the vehicle body compact.

In this case, the rectifier 100 is attached to the support portions 53a and 53b of the frame-shaped frame 42 via an attachment bracket 51e. The first brace 41 and the second brace 61 of the cowl brace 40 are formed so as to be separable in the front-rear direction. In a state where the second brace 61 is detached from the first brace 41, a sufficient working space for attaching the rectifier 100 to the first brace 41 is secured. Therefore, even a large component such as the rectifier 100 can be easily attached on the inner side of the cowl brace 40.

As described above, the center in the left-right direction of the bottom wall portion 65 of the second brace 61 is recessed toward the upper side, and the recess 70 of the bottom wall portion 65 extends in the vehicle body front-rear direction. A lower bracket cover 25 that covers a lower bracket 24 is attached to the front forks 23 so as to overlap the recess 70 of the bottom wall portion 65 from below. A gap C is formed between the recess 70 of the bottom wall portion 65 and the lower bracket cover 25, and an air guide path through which an air flow by a traveling of a vehicle is introduced into the cowl brace 40 is formed by the gap C. Air enters the air guide path from the gap C during traveling of the vehicle and the air flows rearward through the air guide path, and accordingly heat accumulation caused by the headlamps 91, the rectifier 100, and the like is alleviated.

More specifically, an upper surface and both side surfaces of the air guide path are formed by the recess 70 of the bottom wall portion 65, and a bottom surface of the air guide path is formed by the lower bracket cover 25. The air guide path extends so as to guide air to the installation space for the rectifier 100 during traveling of the vehicle. Further, a front end of the rectifier 100 is positioned on a front side of a rear end of the lower bracket cover 25 so as to reliably guide air to the installation space for the rectifier 100 during traveling of the vehicle. Therefore, air enters the air guide path from the gap C on a front side of the vehicle body during traveling of the vehicle, and the air is effectively guided to the installation space for the rectifier 100 by the air guide path during traveling of the vehicle. Hot air accumulated in the installation space is swept away by the air during traveling of the vehicle, and heat dissipation of the rectifier 100 is promoted.

As described above, according to the present embodiment, the frame structure of the first brace 41 is opened toward the front side, and the rear surface side of the second brace 61 having a box shape is open. Therefore, the rectifier 100 is installed on the inner side of the cowl brace 40, and the front portion of the vehicle body can be made compact. Further, since the first brace 41 and the second brace 61 are separated in the front-rear direction, it is possible to sufficiently secure a working space for attaching the rectifier 100 to the cowl brace 40.

Although a position lamp, a headlamp, a headlamp controller, an ETC antenna, a LIN controller, and a relay are exemplified as in-vehicle components to be attached to a second brace in the present embodiment, the in-vehicle component is not particularly limited. For example, the in-vehicle component may be a vehicle controller. In addition, the in-vehicle component is not limited to an electrical component, and may be a stay of a side mirror. In addition, although a rectifier is exemplified as an in-vehicle component to be attached to a first brace, the in-vehicle component is not particularly limited.

Further, although the position lamp is attached to a front wall portion of the second brace in the present embodiment, an object detector such as a radar for detecting an object in front of the vehicle body may be attached in a case where the position lamp is not attached to the front wall portion of the second brace.

Further, although the rectifier is attached to the first brace in the present embodiment, the rectifier may be attached on a rear surface side of the second brace.

Further, although the position lamp is formed to be long in a left-right direction in the present embodiment, the position lamp may be separated into a left-side part and a right-side part.

Further, although a pair of headlamps are integrated via a plate-shaped connecting portion in the present embodiment, the pair of headlamps may be separated.

Further, although the first brace is formed in a frame structure in the present embodiment in which an upper arm thereof extends obliquely upward while extending toward a front side from a frame-shaped frame and a lower arm thereof extends obliquely downward while extending toward the front side from the frame-shaped frame, the first brace is not limited to this frame structure. The first brace may have a frame structure that is opened toward the front side.

Further, although the second brace is formed in a box shape having a front wall portion, an upper wall portion, a pair of side wall portions, and a bottom wall portion in the present embodiment, the second brace is not limited to this shape. The second brace may be formed in a box shape that is open at least on the rear surface side. For example, the second brace may not have the bottom wall portion.

Further, although an installation space for the in-vehicle component is formed on an inner side of the first and second braces in the present embodiment, an installation space for the rectifier may be formed only on an inner side of the first brace, for example, as long as the installation space for the rectifier is formed by the first and second braces.

Further, although a recess is formed in a bottom wall portion of the second brace in the present embodiment, the recess may not be formed in the bottom wall portion of the second brace. Even if the recess is not formed in the bottom wall portion, a lower bracket cover overlaps with the bottom wall portion, so that it is possible to form an air guide path by the bottom wall portion and the lower bracket cover, through which air is guided to the installation space for the rectifier during traveling of the vehicle.

Although the first brace is formed of a metal material and the second brace is formed of a resin material, the material of the first and second braces is not particularly limited. As the second brace, a brace having a specific gravity smaller than that of the first brace may be used.

In addition, the support structure for an in-vehicle component according to the present embodiment is not limited to the straddle-type vehicle illustrated in the drawings, and may be adopted in other types of straddle-type vehicles. The straddle-type vehicle is not limited to a general vehicle that a rider rides in a posture of straddling a seat, and further includes a scooter-type vehicle that a rider rides without straddling a seat.

As described above, a support structure (cowl brace 40) for an in-vehicle component according to the present embodiment is a support structure for an in-vehicle component that supports an in-vehicle component at a front side of a vehicle body frame (10), and includes a first brace (41) attached to a front portion of the vehicle body frame and a second brace (61) attached to a front portion of the first brace. The first brace has a frame structure opened toward a front side, the second brace has a box shape that is open at least on a rear surface side, and an installation space for the in-vehicle component (rectifier 100) is formed by the first brace and the second brace. According to this configuration, the frame structure of the first brace is opened toward the front side, and the rear surface side of the second brace having a box shape is open. Therefore, the in-vehicle component can be disposed on inner sides of the first brace and the second brace, thereby making a front portion of a vehicle body compact. In addition, since the first brace and the second brace are separated in a front-rear direction, a working space for attaching the in-vehicle component to the first brace and the second brace can be sufficiently secured.

Further, in the support structure for an in-vehicle component of the present embodiment, a part of the in-vehicle component overlaps a central line (L) extending in a vehicle body front-rear direction. According to this configuration, weight distribution of a vehicle body is made close to even in a left-right direction, and thus steering stability is improved.

Further, in the support structure for an in-vehicle component according to the present embodiment, the second brace has a bottom wall portion (65), a vehicle body exterior component (lower bracket cover 25) overlaps the bottom wall portion from below, and the bottom wall portion and the vehicle body exterior component form an air guide path through which air is guided to the installation space for the in-vehicle component during vehicle traveling. According to this configuration, air enters the air guide path from a front side of the vehicle body during vehicle traveling, and the air flows through the air guide path, whereby heat accumulation in the installation space caused by the in-vehicle component is alleviated.

Further, in the support structure for an in-vehicle component according to the present embodiment, a center of the bottom wall portion in a left-right direction is recessed toward an upper side, a recess (70) of the bottom wall portion extends in the vehicle body front-rear direction, and the vehicle body exterior component overlaps the recess from below. According to this configuration, air is effectively guided toward the installation space for the in-vehicle component during vehicle traveling, by the air guide path formed by the recess of the bottom wall portion and the vehicle body exterior component.

Further, in the support structure for an in-vehicle component according to the present embodiment, a front end of the in-vehicle component is positioned on a front side of a rear end of the vehicle body exterior component. According to this configuration, air is reliably guided to the installation space for the in-vehicle component by the air guide path during vehicle traveling.

Although the present embodiment has been described, the above-described embodiment and a modification may be combined in whole or in part as another embodiment.

The technique of the present invention is not limited to the above-described embodiment, and various changes, substitutions, and modifications may be made without departing from the spirit of the technical idea of the present invention. The present invention may be implemented using other methods as long as the technical idea can be implemented by the methods through advance of the technology or other derivative technology. Accordingly, the claims cover all embodiments that may be included within the scope of the technical idea.

What is claimed is:

1. A support structure a that supports a rectifier at a front side of a vehicle body frame, the support structure comprising:
    a first brace that is attached to a front portion of the vehicle body frame; and
    a second brace that is attached to a front portion of the first brace; wherein
    the first brace has a frame structure that is opened toward a front side,
    the second brace has a box shape that is open at least on a rear surface side, and
    an installation space for the rectifier is formed by the first brace and the second brace, and the rectifier is attached to the first brace.

2. The support structure according to claim 1, wherein a part of the in-vehicle component overlaps a central line extending in a front-rear direction of a vehicle body.

3. The support structure according to claim 1, wherein the second brace has a bottom wall portion, and a vehicle body exterior component overlaps the bottom wall portion from below, and
    an air guide path is formed by the bottom wall portion and the vehicle body exterior component, through which an air flow by a traveling of a vehicle is guided to the installation space for the in-vehicle component.

4. The support structure according to claim 3, wherein the bottom wall portion is formed with a recess at a center thereof in a left-right direction,
    the recess of the bottom wall portion is recessed toward an upper side, and extends in the front-rear direction, and
    the vehicle body exterior component overlaps the recess from below.

5. The support structure according to claim 3, wherein a front end of the in-vehicle component is positioned on a front side of a rear end of the vehicle body exterior component.

6. A support structure for an in-vehicle component that supports an in-vehicle component at a front side of a vehicle body frame, the support structure comprising:
    a first brace that is attached to a front portion of the vehicle body frame; and
    a second brace that is attached to a front portion of the first brace; wherein
    the first brace has a frame structure that is opened toward a front side,
    the second brace has a box shape that is open at least on a rear surface side,
    an installation space for the in-vehicle component is formed by the first brace and the second brace,
    the second brace has a bottom wall portion, and a straddle-type vehicle body exterior component overlaps the bottom wall portion from below,
    an air guide path is formed by the bottom wall portion and the straddle-type vehicle body exterior component, through which an air flow by a traveling of a vehicle is guided to the installation space for the in-vehicle component,
    the bottom wall portion is formed with a recess at a center thereof in a left-right direction,
    the recess of the bottom wall portion is recessed toward an upper side, and extends in a front-rear direction of the vehicle body frame, and
    the straddle-type vehicle body exterior component overlaps the recess from below.

* * * * *